(12) United States Patent
Kotzev et al.

(10) Patent No.: US 8,372,899 B2
(45) Date of Patent: *Feb. 12, 2013

(54) FLAME RETARDANT POLYMER COMPOSITIONS

(75) Inventors: Dimiter Kotzev, Corby (GB); Constantinos Diakoumakos, Trumpington (GB)

(73) Assignee: Huntsman Advanced Materials Americas LLC, The Woodlands, TX (US)

( * ) Notice: Subject to any disclaimer, the term of this patent is extended or adjusted under 35 U.S.C. 154(b) by 431 days.

This patent is subject to a terminal disclaimer.

(21) Appl. No.: 12/613,691

(22) Filed: Nov. 6, 2009

(65) Prior Publication Data

US 2010/0056687 A1    Mar. 4, 2010

Related U.S. Application Data

(63) Continuation of application No. 10/539,844, filed on Jan. 20, 2006, now Pat. No. 7,635,728.

(51) Int. Cl.
    *C09K 21/14* (2006.01)
(52) U.S. Cl. .................................................. 523/179
(58) Field of Classification Search .................. 523/179
    See application file for complete search history.

(56) References Cited

U.S. PATENT DOCUMENTS

| | | | |
|---|---|---|---|
| 3,574,644 A | 4/1971 | Olstowski et al. | |
| 4,390,656 A | 6/1983 | Weise et al. | |
| 4,624,998 A | 11/1986 | Keil | |
| 4,694,030 A | 9/1987 | von Bonin et al. | |
| 5,246,974 A | 9/1993 | Jonas et al. | |
| 5,262,454 A | 11/1993 | Leroux et al. | |
| 5,334,656 A | 8/1994 | Yamamoto et al. | |
| 5,508,321 A | 4/1996 | Brebner | |
| 5,760,155 A | 6/1998 | Mowrer et al. | |
| 6,031,040 A | 2/2000 | Horacek | |
| 6,197,869 B1 | 3/2001 | Weber et al. | |
| 6,207,085 B1 | 3/2001 | Ackerman | |
| 6,239,212 B1 | 5/2001 | Green | |
| 6,365,661 B1 | 4/2002 | Fischer et al. | |
| 6,472,070 B1 | 10/2002 | Muraoka et al. | |
| 6,492,453 B1 | 12/2002 | Ebrahimian et al. | |
| 7,635,728 B2 * | 12/2009 | Diakoumakos et al. | 523/179 |
| 2003/0125447 A1 | 7/2003 | Hoch et al. | |

FOREIGN PATENT DOCUMENTS

| | | |
|---|---|---|
| DE | 19702760 | 7/1998 |
| EP | 258728 | 3/1988 |
| EP | 476293 | 3/1992 |
| EP | 519863 | 12/1992 |
| EP | 995778 | 4/2000 |
| GB | 2317616 | 4/1998 |
| GB | 2339431 | 1/2000 |
| GB | 2367064 | 3/2002 |
| JP | 55062988 | 5/1980 |
| JP | 1040588 | 2/1989 |
| JP | 2151622 | 6/1990 |
| JP | 2206685 | 8/1990 |
| JP | 8085760 | 4/1996 |
| JP | 11158354 | 6/1999 |
| WO | WO 99/09070 | 2/1999 |
| WO | WO 99/35186 | 7/1999 |
| WO | WO 00/66657 | 11/2000 |
| WO | WO 01/88029 | 11/2001 |

* cited by examiner

*Primary Examiner* — Edward Cain

(57) ABSTRACT

Flame retardant compositions are disclosed which comprise (a) at least one particulate material which expands on the application of heat and (b) at least one particulate nano-filler, together with at least one polymer and/or at least one curable monomer or oligomer. The compositions may also contain certain silicon-based materials. Flame-retardant compositions comprising polyorganosiloxanes containing one or more functional groups selected from amino, hydroxyl, methacrylic, acrylic and epoxy groups, are also disclosed.

16 Claims, No Drawings

US 8,372,899 B2

FLAME RETARDANT POLYMER COMPOSITIONS

CROSS REFERENCE TO RELATED APPLICATIONS

This application is a continuation of U.S. patent application Ser. No. 10/539,844, pending, which was the National Phase of International Application PCT/GB2003/005503 filed Dec. 18, 2003 which designated the U.S. and which claims priority to United Kingdom (GB) Pat. App. No. 0229810.7 filed Dec. 20, 2002. The noted applications are incorporated herein by reference.

The present invention relates to flame retardant polymer compositions and to curable compositions for preparing them.

In the modern polymer industry, flame-retardants that are used in polymers are generally based on halogens (mainly Cl and Br) and organic or inorganic phosphorus compounds (e.g. ammonium polyphosphate, red phosphorus). Classically, intumescent fire retarded materials contain a char-forming agent which can be a polyol (e.g. pentaerythritol), a catalyst for char formation (usually a phosphoric acid derivative) and a foaming agent, typically melamine. Although these reduce hazards during polymer pyrolysis and combustion by retarding a fire, they nevertheless can generate large amounts of smoke, and they also present serious ecological threats. There is a need for non-toxic (halogen-, phosphorus- and melamine-free), ecologically safe fire retardant or flame retardant or fire resistant (these terms being synonymous for present purposes) compositions characterized by low flammability and limited smoke levels.

Intumescent materials have been used as flame retardants. Expandable graphite has attracted interest over the last few years for the development of novel chemical intumescent systems. For example U.S. Pat. No. 3,574,644 describes a process for increasing the flame resistance of flammable materials by the incorporation of expandable graphite flakes, while U.S. Pat. No. 6,472,070 describes fire-resistant paints containing amongst other ingredients, an epoxy resin, a hardener, and expandable graphite.

Particulate materials known as nanofillers may also be used in composite materials. For example, Wo 99/09070 describes polymer foams which may contain nanofillers. WO 00/66657 describes a polymer composition comprising a polymer and a nano-clay together with a second polymer, and GB 2367064 describes a polymer composition containing a polyolefin together with a nano-clay filler and an additional filler. WO 99/35186 describes nanocomposites based on a polymeric matrix and a layered double hydroxide, and provides information on the preparation of such materials.

We have now found that enhanced flame retardancy in polymer systems can be obtained by using a specific combination of particulate flame retardants. Accordingly, the invention provides a particulate composition for use as a flame retardant additive, which comprises (a) at least one particulate material which expands on the application of heat and (b) at least one particulate nano-filler.

The particulate compositions of the present invention may be used in the manufacture of flame-proof polymers, and may be composited directly with the polymer, or with one or more curable monomers, oligomers and/or polymers for subsequent curing to produce the finished polymer. Accordingly, the invention further provides a composition containing a particulate composition according to the invention together with at least one polymer and/or at least one curable monomer or oligomer.

Any desired monomer, oligomer or polymer, or any mixture thereof, may be present. The fire retardant compositions are suitable for inclusion in a wide variety of compositions which contain or can be cured to give polymers or polymer-based materials, for example, polyamides, nylons, polyesters, epoxy resins, ABS combinations, halogenated polymers such as poly(vinyl chloride) (PVC), polyethylenes, polypropylenes, polyurethanes, polyacrylates/polymethacrylates (home- and copolymers), polystyrenes, polychlopropene, phenolics, silicones, and silicone rubbers and copolymers and combinations of polymers. Preferably a curable monomer, oligomer or polymer contains one or more groups selected from epoxy, acrylic, methacrylic, amine, hydroxyl, carboxyl, anhydride, olefinic, styrene, acetoxy, methoxy, ester, cyano, amide, imide, lactone, isocyanate or urethane. The compositions may if appropriate contain a curing agent. For example, the composition may comprise a mixture of a polyisocyanate bearing at least two isocyanate groups with a polyol bearing at least two hydroxyl groups or with an amine or a carboxylic acid; or a mixture of acrylates or methacrylates with an appropriate initiator.

The invention also provides a cured article which comprises a polymer matrix in association with a flame retardant composition according to the invention.

The invention also provides a process for the manufacture of a cured article, which comprises admixing at least one particulate material which expands on the application of heat, at least one particulate nano filler, and at least one curable monomer, oligomer or polymer, and subsequently curing the resulting mixture. The three components of the curable mixture may be mixed together in any desired order, although preferably the nano-filler is dispersed within the curable material as a first step. Curing may be carried out by any appropriate method, for example the application of heat or light, or the addition of a suitable curing agent, for example an amine, carboxylic acid, carboxylic acid anhydride, or phenol.

Compositions according to the invention are especially suitable for use as adhesives, sealants thermal insulators and coatings. Accordingly, the invention further provides a method of making an adhesive bond, a seal or a coating, which comprises applying a monomer, oligomer and/or polymer-containing composition according to the invention to a substrate and if required curing said composition.

The material comprising component (a) is such that it expands on the application of heat such as experienced during a fire. The material should be such that it expands when exposed to a temperature of above 500° C., preferably above 300° C., especially above 100° C. Preferably component (a) comprises expandable graphite.

Expandable graphite may be manufactured from natural crystalline graphite flake. Deposits of crystalline graphite are numerous and found around the world, usually as inclusions in metamorphic rock, or in the silts and clays that result from their erosion. Graphite is recovered from the ore by crushing and flotation and is usually beneficiated to give graphite flake that is 90-98% carbon. Crystalline graphite consists of stacks of parallel planes of carbon atoms. Because no covalent bonding exists between the layers other molecules can be inserted between them (intercalation). In one commercial process for the production of expandable graphite, sulphuric acid is inserted into the graphite after which the flake is washed and dried. The intercalant is trapped inside the graphite lattice, so the final product is a dry, pourable, non-toxic material with minimal acidity (pH~3-4). When the intercalated graphite is exposed to heat or flame, the inserted molecules decompose to generate gas. The gas forces apart the carbon layers and the graphite expands.

The flakes of expandable graphite are generally plate-like. For a 50-mesh flake, the typical length and width are about 0.5 mm, with the largest particles generally being about 0.9 mm, while the typical thickness is about 0.08 mm. For a 80-mesh flake, the typical length and width are about 0.4 mm whilst the typical thickness is about 0.07 mm. A wide variety of expandable graphites of different particle sizes, acidity, decomposition temperatures, and expansion efficiency, are nowadays commercially available (e.g. GRAFGUARD® product series by Graftech). Any of these are suitable for use in the present invention. The various grades of expandable graphite available typically expand when exposed to temperatures in the range of 160 to 260° C. or higher.

The proportion of component (a), especially expandable graphite, used in a monomer, oligomer and/or polymer-containing composition of the invention preferably ranges between 0.1 and 95% w/w, preferably between 1 and 40% w/w.

Nano-fillers are particles of a sub-micron size. Typical nano-fillers may comprise silica, barium sulphate or, especially, clays. A nano-clay is an ionic phyllosilicate; it may be any hydrophilic or organophilic layer silicate obtainable from a natural or synthetic layer silicate. Such materials have a sheet-type or platey multiscale structure. At the Angström scale is the platelet, which is 0.7-1 nm thick and several hundred nanometers long and wide (ca. 100-1000 nm). As a result individual sheets have aspect ratios (Length/Thickness, L/T) varying from 200-1000 or even higher, with a majority of platelets in the 200-400 range after purification. In other words, these sheets usually measure approximately 200×1 nm (L×T). At the micron scale, these platelets are stacked into primary particles and at higher scale, these primary particles are stacked together to form aggregates (usually about 10-30 μm). The aforementioned silicate layers form stacks with a gap in between them called the interlayer or the gallery. Isomorphic substitution within the layers ($Mg^{2+}$ replaces $Al^{3+}$) generates negative charges that are counterbalanced by alkali or alkaline earth cations situated in the interlayer. The inorganic cations can be substituted by other cations. The exchanges with cationic surfactants such as bulky alkyl ammonium-ions, increase the spacing between the layers and reduce the surface energy of the filler. Therefore these modified fillers (called organoclays) are more compatible with polymers and form polymer-layered silicate nanocomposites. Montmorillonite, hectorite and saponite are the most commonly used layered silicates.

Component (b) may for example comprise nano-scale hydrotalcite, octasilicate, mica fluoride or nano-clay for example montmorillonite, the latter being preferred. Preferably component (b) comprises a nano clay. This may be natural or intercalated.

The proportion of component (b), especially nano-clay, used in a monomer, oligomer and/or polymer-containing composition of this invention preferably ranges between 0.1 to 95% w/w based on the total weight of the composition, preferably between 5 to 25% w/w.

It has been found that the expandable material acts synergistically with nano-fillers, typically natural or intercalated nano-clays, resulting in a significant decrease of the levels of smoke produced during the pyrolysis or combustion of the polymer.

In a further embodiment of the present invention, the particulate flame retardant composition and the curable composition according to the invention preferably contain at least one other particulate material having fire retardant properties, for example metal oxides/acids, hydrates, hydroxides, aluminates, carbonates, sulphates, silicates, nitrides, molybdates and stearates, for example zinc or calcium borates, stannates or molybdates, zinc or magnesium stearates, ammonium molybdates, calcium hydroxide, aluminium trihydroxide (e.g. FrameGard® by ALCOA Industrial Chemicals), silicon oxide, silicon nitride, boron nitride, sodium metalsilicate pentahydrate, potassium tetraborate tetrahydrate, magnesium hydroxide (e.g. MagShield® by Martin Marietta), magnesium silicates, titanium oxide, ferric oxide, molybdenum oxide, lead phthalate, stannous chloride, and where appropriate, complexes thereof. Preferably at least two of such materials are present. Preferably such material is present in an amount of from 1 to 95% w/w, preferably 1 to 40% w/w.

It has been found that the dispersion of the expandable material into the monomer, oligomer and/or polymer-containing material and subsequently its effectiveness is enhanced by the introduction of any of the aforementioned inorganic additives. Indeed, with certain additives, there is no obvious indication that a composition contains expandable graphite although its colour (black) and appearance indicate its presence in compositions not containing such additives. Moreover, enhanced homogeneity of mixtures of the expandable material, especially expandable graphite, with organic resins and/or monomers was found to be promoted by the introduction of certain inorganic additives. In addition, the smoke suppression synergism referred to above is further enhanced by the addition of a further particulate material as described above, especially zinc borates/stannates/molybdates or ammonium molybdates.

A preferred particulate composition according to the invention comprises 0.1 to 95% expandable graphite; 0.1 to 95% zinc borate, stannate or molybdate; 0.1 to 95% ammonium octamolybdate; 0.1 to 95% aluminium trihydroxide; and 0.1 to 95% nano-clay.

When polymeric materials according to this invention are exposed to fire or to excessively high temperatures, in-situ formation of probably glass-like protective layer(s) structures occurs. This combines in a synergistic fashion with the intumescent action of the expandable material, which tends to form a char consisting of "worms", to provide a complex and very effective flame retardant mechanism for polymeric matrices. The formation of protective layer(s) structures has been verified by optical microscopy. It seems that the initially formed char resulting from the expansion of the expandable material provides the necessary protection for the subsequent in-situ formation of protective layer(s) structures underneath the char, providing additional protection to the polymeric matrix.

The compositions of the invention may be used to produce articles which have, effectively, a latent fire-retardant capacity, i.e. when exposed to fire, they will resist that fire. In an alternative embodiment, the article may be specially treated at elevated temperature after curing under such conditions that a fire resistant coating is produced on the surface of the object. This coating comprises probably a glass-like or ceramic protective layer as described above. Accordingly, the invention further provides an article comprising a fire-resistant coating which has been prepared by subjecting a cured object according to the invention to sufficient heat to create a fire-resistant coating.

Further improvement of the flame retardancy of the polymer compositions of the present invention was found to take place in the presence of the inorganic additives described above, acting through the formation of very effective protective layer(s) of probably glass-like structure that apparently protects further the polymer substrate from further decomposition. Thus, zinc borate may contribute to low smoke levels and also to the formation of glass-like protective layer structures that comprise a secondary flame retardant mechanism complementary to the intumescent expandable graphite. In addition, the in-situ formation of such a tough layer underneath the "worms", enhances further any mechanical strength the polymeric matrix can provide, allowing the expandable graphite to be effective. Aluminium trihydroxide may also contribute to the formation of glass-like protective layer structures, even when used in small amounts, for example around 10% w/w.

The total content of particulate material in a monomer, oligomer and/or polymer-containing composition according to the invention should of course be at a level such that the mechanical properties and performance of the polymeric matrix are adequate for the intended application. The total amount of particulate material present in a composition according to the invention is preferably in the range of from 1 to 95% w/w, preferably from 5 to 60% w/w, especially 10 to 40% w/w.

The compositions may also include further constituents, which are routinely present in conventional fire retardant products. These may include for example fibrous and/or particulate fillers and/or reinforcements, for example reinforcement fibres (e.g. glass, carbon or basalt or mixtures thereof); fillers and/or pigments not previously mentioned as having flame retardant properties, for example various other metal oxides, metal hydrates, metal hydroxides, metal aluminates, metal carbonates, metal sulphates, starches, talcs, kaolins, molecular sieves, fumed silica, or organic pigments). Additives such as stabilizers, rheology modifiers and surfactants may also be included. The particle size of any particulate fillers is preferably less than 20 μm.

When preparing a composition according to the invention, preferably the nano-filler is admixed with the monomer, oligomer and/or polymer in a first step, and then the expandable material and any other additives are added subsequently, either individually or in combinations of two or more. Other mixing processes may be used, for example, mixing the expandable material and the nano-filler together with the monomer/oligomer/polymer.

Polymer compositions according to the invention may for example be used in the aerospace, cable, automotive, military, paints and coatings and building industries. They may for example be used as adhesives, sealants, paints/coatings, casting resins, fireproofing agents, thermal insulators, reinforcing or thixotropic agents, cables, in shapable moulding materials and in finished mouldings or in composite materials, preferably in nanocomposites. A nanocomposite is a near-molecular blend of resin molecules and nano-scale particles.

The invention further provides compositions based on reactive monomers, oligomers, polymers, which upon cure form adhesives, sealants, thermal insulators, coatings or moulded objects, characterised with improved flame-retardance, fire resistance, thermal insulation and reduced smoke emission on burning, containing a synergistic blend of expandable graphite and nano-clay and optionally one or more flame retardant additives and smoke suppressants from the group comprising of zinc borate, aluminium trihydroxide, ammonium octamolybdate, etc. wherein the reactive species are selected from the following groups:
  a. epoxy-functional compounds and resins in combination with amino-functional compounds, resins, oligomers, polymers;
  b. hydroxy-functional compounds, oligomers, polymers in combination with isocyanate-functional monomers, dimmers, oligomers, polymers;
  c. methacrylic or acrylic functional monomers in combination with methacrylic and acrylic functional oligomers or polymers.

In a further embodiment of the invention there is provided a fire-resistant material which comprises a blend of polymers of which at least one is a silicone introduced into the polymeric matrix, by means other than condensation or hydrosilylation.

Suitable siloxane compounds include amino-, alkoxy-, hydroxy- or epoxy functional polyorganosiloxanes and methacrylated or acrylated polyorganosiloxanes, polydimethylsiloxanes being preferred. Other suitable polysiloxanes or polyorganosiloxanes are those where the silicon atom of their repeating unit(s) can be mono- or disubstituted by hydrogen, hydroxyl, alkyl, aryl, arylalkyl, alkylaryl, halogenalkyl, alkoxy, alkoxyalkyl, alkoxyaryl, aryloxyalkyl, arylalkoxy, phenyl, cycloalkyl, glycidyl alkyl, alkyloxycycloalkyl or aryloxycycloalkyl group.

It is a further objective of the present invention to provide a composition based on reactive monomers and oligomers wherein the reactive monomers are selected from the following groups:
  a. epoxy-functional compounds and resins in combination with amino-functional compounds, resins or oligomers;
  b. hydroxy-functional compounds or oligomers in combination with isocyanate-functional monomers, dimers or oligomers;
  c. methoxy-functional compounds or oligomers in combination with isocyanate-functional monomers, dimers or oligomers;
  d. methacrylic or acrylic functional monomers in combination with methacrylic and acrylic functional oligomers or polymers;
  e. amino-functional polydimethylsiloxane in combination with epoxy-functional compounds, resins or oligomers;
  f. hydroxy-functional polydimethylsiloxane in combination with isocyanate-functional monomers, dimers or oligomers;
  g. methoxy-functional polydimethylsiloxane in combination with isocyanate-functional monomers, dimers or oligomers;
  h. methacrylated or acrylated polydimethylsiloxane
  i. combinations in any proportions of groups a. and d.;
  j. combinations in any proportions of groups b. and e.;
  k. combinations in any proportions of groups c. and f.

Preferably such compositions also contain one or more additives selected from expandable graphite, nano-clay, and one or more flame retardant additives mentioned above. The silicon-based materials according to the invention may, if desired, contain the particulate fire resistant package described above. Preferably the polyorganosiloxane is polydimethyl siloxane.

According to the invention curing at either room temperature or elevated temperature between a functional silicone and an epoxide, isocyanate, amine, alkoxysilanes, functional silanes moieties etc. or homo-/co-polymerized via free-radical polymerization in the presence of a suitable initiator, can afford materials of enhanced fire resistance without the use of inorganic additives such as those mentioned above. In this case the dominant and probably the main flame retardant mechanism comprises the formation of a coherent and relative elastic char which holds together and would not fall off an underside surface when that surface is positioned substantially horizontally.

It has also been found that mixtures of silicones in various weight percentages preferably in the range of 15-35% with a polymer or polymerizable monomer(s) afford incombustible and limited smoke polymeric compositions without the need to use any other additive. Further enhancement of the flame retardancy can be achieved by the introduction of the aforementioned additives in a variety of combinations; preferably an expandable material, especially expandable graphite, is the main component. The introduction of relatively low amounts of either functional or non-functional silicones into carbon-based polymeric networks lowers the combustibility and therefore contributes to an enhanced overall flame retardancy performance. The introduction of expandable graphite and various inorganic additives into the complex polymeric networks reduces the dripping and the smoke levels and lowers further the ignitability of the material.

Following flame testing of materials containing silicon and also expandable graphite, substantial amounts of silicon were found hosted in the carbon "worms", resulting in an enhanced protection of the char provided by the expansion of the expandable graphite during the polymer's pyrolysis and combustion process, dramatically increasing the char's protective role and heat transfer barrier capability along with significant decrease in smoke levels (smoke suppression effect).

Further improvement of the flame retardancy of the compositions of the present invention was found to take place in the presence of certain of the inorganic additives as those described here before, acting through the formation of very effective protective layer(s) of probably glass-like structure that apparently protects further the organic or silicon or organic and silicon substrate from further decomposition. The formation of protective layer(s) structure has been verified by optical microscopy.

In the case of blends of functional or non-functional organic polymers or organic polymerizable monomers with functional or non-functional silicones, the proportion of the latter to the other organic component is typically from 99:1% to 1:99% by weight and preferably between 3 to 80%.

In silicon-based polymeric platforms, a synergy between expandable graphite and various inorganic additives as those mentioned herein, is found to decrease smoke levels.

In addition, in silicon-based polymeric materials, a synergy between nano-fillers, especially nano-clays, and various inorganic additives mentioned herein, is found to decrease smoke levels, while the introduction of ammonium molybdates lowers the flammability of the material.

The silicon-based materials according to the invention are attractive for use in flame-retardant products as they produce protective surface coatings during a fire and because of their high heat resistance, non-toxicity, and also the non-generation of toxic gases during combustion. These three very important characteristics imply their suitability in use in "green" flame retarded products either participating as additives or as part of the chemical structure of the polymer-based "carrier" platform.

In tests, silicon-based formulations presented somewhat better flame retardancy than their carbon-based counterparts. The reason for that is the coexistence of at least two successive protective layers underneath the char originating with the expandable graphite. Optical microscopy studies and elemental analyses carried out on the residues of tested compositions as well as on unexpanded expandable graphite show the formation of a series of at least two protective layers, the top layer very rich in SiOx and the one underneath this one and on top of the polymeric matrix relatively rich in materials (probably of glass-like structure) formed from the rest of the inorganic oxides. It is believed that more than one successive protective layer is formed in the case of silicon-based compositions because silicone molecules tend to move towards the film's surface drifting the molecules of the inorganic additives towards the surface as well, promoting the formation of protective layer(s) structures.

The invention provides compositions based on reactive monomers, oligomers and polymers, which upon cure form adhesives, sealants, thermal insulators, coatings or moulded objects, characterised with improved flame-retardance, flame resistance, thermal insulation and reduced smoke emission on burning, comprising a blend of polyorganosiloxane containing one or more functional groups selected from: amino, hydroxyl, methacrylic, acrylic, and epoxy groups and a second component, wherein the reactive species of the second component are selected from one or more of the following groups:

a. epoxy-functional compounds and resins in combination with amino-functional compounds, resins, oligomers, polymers;
b. hydroxy-functional compounds, oligomers, polymers in combination with isocyanate-functional monomers, dimmers, oligomers, polymers;
c. methacrylic or acrylic functional monomers, methacrylic and acrylic functional oligomers or polymers;

The invention also provides compositions based on reactive monomers, oligomers, polymers, which upon cure form adhesives, sealants, thermal insulators, coatings or moulded objects, characterised with improved flame-retardance, flame resistance, thermal insulation and reduced smoke emission on burning, containing a synergistic blend of expandable graphite and nano-clay and optionally one or more flame retardant additives and smoke suppressants from the group comprising of zinc borate, aluminium trihydroxide, ammonium octamolybdate, etc, wherein the reactive species are selected from the following groups:

a. epoxy-functional compounds and resins in combination with amino-functional compounds, resins, oligomers, polymers;
b. hydroxy-functional compounds, oligomers, polymers in combination with isocyanate-functional monomers, dimmers, oligomers, polymers;
c. methacrylic or acrylic functional monomers in combination with methacrylic and acrylic functional oligomers or polymers;
d. amino-functional polyorganosiloxane in combination with epoxy-functional compounds, resins or oligomers;
e. hydroxy-functional polyorganolsiloxane in combination with isocyanate-functional monomers, dimers or oligomers;
f. methacrylated or acrylated polyorganosiloxane
g. combinations in any proportions of groups a. and d.;
h. combinations in any proportions of groups b. and e.
i. combinations in any proportions of groups c. and f.

Preferably the polyorganosiloxane is polydimethylsiloxane.

The following Examples illustrate the invention.

EXAMPLES

Flammability Test Method

The flammability of the compositions was tested according to the BSS 7230 test (F2 method, vertical test procedure). Coatings of the compositions on aluminium strips mm) were applied via a draw down bar (average dry film thickness: 0.15-0.20 mm). The samples were left to cure at room temperature for 1 day prior to testing. The test procedure was as follows:

A Bunsen burner (methane type flame, average temperature about 950° C.) was positioned at least 76 mm from the specimen holder. The aluminium strip coated with the composition was placed in the specimen holder and subsequently, the latter was inserted vertically into the test specimen holder located so the bottom edge of the specimen is nominally 19 mm above the top of the burner orifice and then the cabinet door was closed. A timer was set to zero and started after the burner was positioned under the lower edge of the centre of the face of the specimen. The flame was applied for 12 sec (ignition time) and then withdrawn by moving the burner at least 76 mm away from the specimen.

The extinguishing time, afterglow time, and drip extinguishing time were noted. For materials that shrank or melted away from the flame, the farthest distance that the foot of the flame traveled up the specimen was noted.

After the test was complete, the cabinet door was opened, and the test cabinet cleared of smoke and fumes under a fume hood. The specimen was removed from the chamber and subsequently the specimen's surface was cleaned of soot and smoke stains with a tissue to aid in determining burn length.

Every composition was burn tested twice and the mean values are those reported hereafter.

Compositions were also tested by differentiating the oxygen content of the flame shifting from yellow-type flame as described in BSS7230 to a purely blue type flame and in all cases the results were exactly the same indicating the independence of the flame-retarded polymeric compositions from the oxygen content (ventilation conditions) of the environment in which a fire can take place.

During each test, an estimation of the levels of smoke generated during a specimen's combustion was also recorded. The observed smoke levels were characterized as follows:

| Description of smoke levels | Smoke description term | Smoke level |
|---|---|---|
| No visible signs of smoke during the whole test | No smoke | 0 |
| Limited smoke during only the first 5 sec of ignition time | Limited smoke | 1 |
| Limited signs of smoke during only the ignition time (12 sec) | Little smoke | 2 |
| Some smoke (higher levels than previously) during the whole test (easily extracted during the test) | Some smoke | 3 |
| Intense smoke during the whole test (smoke remains in the test cabinet but it is extracted after 20 sec without opening the cabinet's door). | Intense smoke | 4 |
| Thick smoke during the whole test (need to open the door of the cabinet 20 sec upon the completion of the test to help extraction). | Thick smoke | 5 |

This test finds wide use in the qualification of aerospace adhesives (e.g. BOEING Co., etc) and is approved by the FAA (Federal Aviation Agency, U.S.A.). An adhesive is regarded as having adequate flame retardancy if it reaches the following targets: extinction time: 15 sec. burn length: 20.32 cm, dripping extinction time: 5 sec and no afterglow.

When some afterglow and/or dripping were recorded, their corresponding times are reported in the test results.

Thermal Insulation Assessment Method

The thermal insulation of certain compositions was evaluated in the same experimental set up used to evaluate the flame retardancy according to the following procedure: compositions were shape-moulded in 10×10×25 mm bars and a cylindrical hole (1 mm in diameter) was drilled through one end of the bar until 1 mm from its other end. A thermocouple probe was fitted such as its tip to record the temperature of the specimen was just 1 mm from the bar's front (measurement end) where the Bunsen burner's flame (methane type flame, average temperature about 950° C.) was to be applied.

A Bunsen burner was positioned at least 76 mm from the specimen holder. The bar fitted with the thermocouple probe was placed in an appropriately fabricated specimen holder and subsequently, the latter was inserted horizontally so the measurement end of the bar is nominally 19 mm above the top of the burner orifice and then the cabinet door was closed. The thermocouple probe (type-K) was connected to a Barnant digital thermometer and the latter to a handheld printer (Hewlett Packard 8224) via an infrared connection. Temperature measurements were performed in time intervals starting immediately after the burner was positioned under the measurement end of the bar. The flame was applied for 260 see (unless otherwise stated) and then withdrawn by moving the burner at least 76 mm away from the specimen.

After the test was complete, the cabinet door was opened, and the test cabinet cleared of smoke and fumes under a fume hood. The specimen was removed from the chamber and subsequently the specimen's surface was cleaned of soot and smoke stains with a tissue to aid in determining the damage.

Physical/Mechanical Properties Test Methods

Glass transition temperatures ($T_g$) were determined via DSC (differential scanning calorimetry), TMA (thermal mechanical analysis) and DMA (dynamic mechanical analysis). The corresponding apparatuses were: a differential scanning calorimeter (DSC), DSC-2920 (TA Instruments) equipped with a high temperature cell (nitrogen atmosphere, heating rate: 10° C./min), a thermo mechanical analyser, TMA 40 (Mettler) (nitrogen atmosphere, heating rate: 10° C./min) and a dynamic mechanical analyser, AR-2000 (TA Instruments) (rectangular solid specimen 10×2×55 mm, strain: ±1%, frequency 1 Hz, air atmosphere, heating rate 5° C./min).

Thermal expansion coefficient was determined via TMA, on a TMA 40 (Mettler) (nitrogen atmosphere, heating rate: 10° C./min).

Young's storage modulus (G') at 23° C. was measured via DMA, on a dynamic mechanical analyser, AR-2000 (TA Instruments) (rectangular solid specimen 10×2×55 mm, strain: ±1%, frequency 1 Hz, air atmosphere, heating rate 5° C./min).

Lap shear strength measurements at 23° C., were performed on an Instron 4467 according to EN 2243-1.

Charpy impact strength at 23° C. was measured according to ISO 179.

Fracture energy and fracture toughness at 23° C. were measured according to ASTM D-5045.

Compression strength and compression modulus at 23° C. were measured according to ASTM 695.

Average peel load at 23° C., was measured according to EN 2243-2 (120° roller peel test).

Examples 1-8

Preparation of Dispersions of Nano-Clays in Various Polymers or Polymerizable Monomers Solventless dispersions of nano-clays Cloisite 25A (Trade Mark, Southern Clays) and Nanofil32 (Trade Mark, Süd Chemie) in various resins or polymerizable monomers were prepared via the following general procedure:

A mixture of resin or polymerizable monomer (100 parts by weight) (see Table 1) and one of the aforementioned nano-clays (10 parts by weight) were placed in a round bottom flask equipped with a mechanical stirrer, heating mantle and a digital temperature controller (accuracy ±1° C.). Subsequently the mixture was heated at a temperature between 50 and 60° C. (or where necessary dispersion took place without heating) for 6 hours under high shear (3-3500 rpm). The paste was then removed from the flask and placed in a plastic container. Table 1 summarizes the preparation of each of the dispersions (resin, nano-clay, temperature) and the product names assigned to them.

TABLE 1

| Resin or Monomer | Description of resin or monomer | Nano-clay | Temp (° C.) | Product name |
|---|---|---|---|---|
| Wacker Silicone Fluid 65000VP | amino-functionalised silicone (MW = 10000 based on PDMS) (functionality = 2.6) | Cloisite 25A | 60 | D4608 |
| Wacker Silicone Fluid 65000VP | amino-functionalised silicone (MW = 10000 based on PDMS) (functionality = 2.6) | Nanofil 32 | 60 | D5006 |
| Wacker Silicone CLM42205 | hydroxypropyl terminated silicone (MW = 3250) (functionality = 2) | Cloisite 25A | 60 | D3710 |
| Wacker Silicone Methacrylate CLM42305 | bis-methacrylmethyl silicone | Cloisite 25A | 50 | D3611 |
| VANTICO MY-0510 | epoxy resin (EEW = 101) (functionality = 3) | Cloisite 25A | 50 | D4208 |
| VANTICO MY-0511 | epoxy resin (EEW = 101) (functionality = 3) | Nanofil 32 | 50 | D3508 |
| DOW Voranol EP1900 | hydroxyl terminated poly(propylene glycol) type resin (MW = 3800) (functionality = 2) | Cloisite 25A | 60 | D3711 |
| Methyl methacrylate | Methacrylate | Cloisite 25A | 25 | D3811 |

Nano-clays Cloisite 25A ($d_{001}$=18.6 Å), and Cloisite 10A ($d_{001}$=19.2 Å) were provided by Southern Clays whilst Nanofil 32 ($d_{001}$=18.0 Å) was provided by Süd Chemie. They have been all prepared from natural nano-clays by treatment with a surface modifier (intercalant). Dimethyl-hydrogenated tallow, 2-ethylhexyl quaternary ammonium salt (hydrogenated tallow ~65% C18, ~30% C15, ~5% C13), dimethyl-benzyl hydrogenated tallow quaternary ammonium salt (hydrogenated tallow ~65% C18, ~30% C16, ~5% C14), and stearyl-benzyldimethylammonium salt, are their intercalants respectively.

Examples 9-12

Preparation of Reference Formulations

A commercially available and widely known halogen-based flame retarded 2k-epoxy adhesive, EPTBOND 1559 (Trade Mark, Vantico Ltd.) was used as a comparison halogen-based flame retarded composition (example 9). For the purposes of the present invention a cartridge was used to dispense and mix the material. The product name assigned to this reference formulation is R1H.

Comparison formulations containing an epoxy (R1) (example 10), polyurethane (R2) (example 11) and polymethacrylate (R3) (examples 12) were prepared. All reference compositions were cured at room temperature for 1 day prior to the flammability testing. Table 2 summarizes the compositions and the product names assigned to formulations.

TABLE 2

| | | Composition | | |
|---|---|---|---|---|
| | | R1 | R2 | R3 |
| Resin or Monomer | Description | Weight (g) | | |
| MY-0510 | epoxy resin | 10 | | |
| Voranol EP1900 | hydroxyl functionalized resin | | 10 | |
| Methyl methacrylate | methacrylate | | | 10 |
| Tetraethylpentamine | Amine | 2.68 | 0.57 | |
| Tolylene diisocyanate | isocyanate | | | |
| DBTDL | PU catalyst | | 0.06 | |
| Poly(urethane-methacrylate) | polyurethane | | | 4.54 |
| Dimethyl p-toluidine | tertiary amine | | | 0.45 |
| Benzoyl peroxide | free-radical initiator | | | 0.43 |

Procedure:

The ingredients were added in the order they appear in the Table 2. Subsequently, they were mixed thoroughly and then coated on aluminium strips (for flammability testing) according to the procedure described above.

The following Table summarizes the BSS7230 flammability test results for the reference compositions.

TABLE 3

| | Compositions | | | |
|---|---|---|---|---|
| BSS7230 Test | R1H | R1 | R2 | R3 |
| Extinction time (sec) | 2 | 64 | 17 | 28 |
| Burn length (cm) | 13 | 30.5 | 17.0 | 30.5 |
| Dripping extinction time (sec) | 0 | 10 | 0 | 0 |
| Afterglow (sec) | 0 | 0 | 0 | 0 |
| Smoke | 5 | 5 | 4 | 3 |

The additives and their suppliers that were used in the example compositions were: expandable graphite (Grafguard 220-80B, expansivity 100 cc/g, by Graftech), ammonium octamolybdate (Climax Chemicals), zinc borate (FirebrakeZB, by OMYA UK Ltd.), aluminium trihydroxide (ULV84, by Alcan Chemicals and Apyral-22 by Nabaltec GmbH) boron nitride (BNSP-2CL, SHS Ceramicas) and silicon nitride (SNSP-2, SHS Ceramicas)

Examples 13-27

Preparation of Novel Flame Retardant Compositions

The following formulations were prepared according to the procedure described below.

TABLE 4

| Resin or dispersion | C1* | C2* | C3 | C4 | C5* | C6* | C7 | C8 | C9 | C10 | C11 | C12 | C13 | C14 | C15 |
|---|---|---|---|---|---|---|---|---|---|---|---|---|---|---|---|
| | | | | | | | Weight (g) | | | | | | | | |
| MY-0510 | 14.00 | 14.00 | | | 13.50 | | | | | | | | | | |
| D4208 | | | | | | 14.85 | 14.85 | 14.85 | 14.85 | 14.85 | 14.85 | 14.85 | 14.85 | | |
| D3508 | | | 15.40 | 15.40 | | | | | | | | | | | |
| Tetraethylpentamine | 3.74 | 3.74 | 3.74 | 3.74 | 3.63 | 3.63 | 3.63 | 3.63 | 3.63 | 3.63 | 3.63 | 3.63 | 3.63 | | |
| D3711 | | | | | | | | | | | | | | 11.00 | |
| Tolylene diisocyanate | | | | | | | | | | | | | | 0.58 | |
| DBTDL | | | | | | | | | | | | | | 0.12 | |
| D3811 | | | | | | | | | | | | | | | 11.00 |
| Poly(urethane-methacrylate) | | | | | | | | | | | | | | | 4.54 |
| Dimthelyl p-toluidine | | | | | | | | | | | | | | | 0.45 |
| Benzoyl peroxide | | | | | | | | | | | | | | | 0.42 |
| Ammonium Octamolybdate | | | | | 0.72 | 0.72 | | 0.69 | 0.69 | 0.79 | 0.75 | 0.72 | 0.81 | 0.50 | 0.77 |
| Expandable graphite 220-80B | 0.94 | 4.44 | 1.00 | 4.78 | 1.71 | | 1.77 | 1.77 | 1.77 | 1.85 | 0.75 | 0.24 | 1.89 | 1.14 | 1.79 |
| Zinc borate | | | | | 2.43 | 2.40 | 2.52 | | 2.31 | 2.64 | 2.49 | 2.43 | | 1.64 | 2.55 |
| Aluminum trihydroxide | | | | | 2.43 | 2.40 | 2.52 | 2.31 | | 2.64 | 2.49 | 2.43 | 2.70 | 1.64 | 2.55 |
| Boron nitride | | | | | | | | | | | | | 1.35 | | |
| Silicon nitride | | | | | | | | | | | | | 1.35 | | |

*indicates a comparative example

Procedure:

The ingredients of the formulations C1-C13 were added and mixed as follows:

1$^{st}$ addition: All the components except the tetraethylenepentamine. Thorough mixing.

2$^{nd}$ addition: Tetraethylenepentamine is added to the previously prepared mixture.

Subsequently, they were mixed thoroughly and then coated on aluminium strips (for flammability testing) according to the procedure described above.

The ingredients of the formulations C14-C15 were added and mixed as follows:

1$^{st}$ addition: All the components except the tolylene diisocyanate and the benzoyl peroxide, respectively. Thorough mixing.

2$^{nd}$ addition: Tolylene diisocyanate or benzoyl peroxide were added to their corresponding previously prepared mixtures.

Subsequently, they were mixed thoroughly and then coated on aluminium strips (for flammability testing) according to the procedure described above.

The following Table summarizes the BSS7230 flammability test results for the comparison compositions.

retardancy but also and most importantly the smoke suppression effect. When no expandable graphite is present (comparison composition C6), the inorganic additives alone are not able to achieve the same flame resistance. The flammability test data of the compositions C5 (comparison) and C10 provide strong evidence of effective smoke suppression and smaller burn lengths. The additional contribution of ammonium octamolybdate to smoke suppression can be very clearly established upon comparing the compositions C7 and C10. Further synergy between expandable graphite, zinc borate, nano-clay and ammonium octamolybdate can be seen by comparing the compositions, C3, C6, C7, C8 and C10. A composition with no zinc borate presented higher smoke levels and also higher burn lengths. Aluminium trihydroxide was found to contribute to zero extinction times (compositions C6, C9 and C10). The effect of boron and silicon nitrides is shown in compositions C13 and C8.

The newly developed flame retardant package was applied to a polyurethane and a poly(methyl methacrylate)—compositions C14 and C15, compare to comparison compositions R2 and R3, Table 3. This illustrates the effectiveness of the novel flame retardant package in soft polymeric matrices.

TABLE 5

| BSS7230 Test | C1* | C2* | C3 | C4 | C5* | C6* | C7 | C8 | C9 | C10 | C11 | C12 | C13 | C14 | C15 |
|---|---|---|---|---|---|---|---|---|---|---|---|---|---|---|---|
| | | | | | | | Compositions | | | | | | | | |
| Extinction time (sec) | 52 | 0 | 3 | 0 | 0 | 10 | 0 | 0 | 3 | 0 | 5 | 7 | 4 | 6 | 0 |
| Burn length (cm) | >20 | 6.0 | 7.0 | 5.0 | 4.0 | 20.0 | 6.0 | 9.0 | 10.0 | 3.0 | 10.0 | 11.0 | 10.0 | 7.0 | 7.0 |
| Dripping extinction time (sec) | 0 | 0 | 0 | 0 | 0 | 0 | 0 | 0 | 0 | 0 | 0 | 0 | 0 | 0 | 0 |
| Afterglow (sec) | 0 | 0 | 0 | 0 | 0 | 0 | 0 | 0 | 0 | 0 | 0 | 0 | 0 | 0 | 0 |
| Smoke level | 5 | 2 | 2 | 2 | 4 | 2 | 2 | 4 | 3 | 1 | 2 | 3 | 2 | 1 | 2 |

*indicates a comparative example

Upon comparing compositions C3 and C1 (comparison), C2 (comparison) and C4, the synergy of expandable graphite with the nano-clay is seen not only as regards enhanced flame All of the formulations according to the invention based on the epoxide MY-0510 presented enhanced flame proofness over commercial halogen-based flame retardant (R1H, Table 3) and unfilled epoxy counterparts (R1, Table 3). In particular, the excellent flame retardancy performance of the C10 composition (zero extinction time, minimal burn length, no dripping, no afterglow and limited smoke) was far better than any of the epoxy-based comparison compositions.

Examples 28-49

Preparation of Novel Flame Retardant Compositions Based on Silicon Polymeric Platforms The following formulations were prepared according to the procedure described below

TABLE 6

| Resin or dispersion | Compositions Wt. (g) | | | | | | | | | | |
|---|---|---|---|---|---|---|---|---|---|---|---|
|  | S1 | S2 | S3 | S4 | S5 | S6 | S7 | S8 | S9 | S10 | S11 |
| Silicone fluid 65000 | 15.00 | 15.00 | 15.00 | 15.00 | 15.00 | 15.00 | | | | | |
| D4608 | | | | | | | | | | | |
| D5006 | | | | | | | 14.76 | 14.76 | 14.76 | 14.76 | 14.76 |
| MY-0510 | 1.85 | 1.85 | 1.85 | 1.85 | 1.85 | 1.85 | 1.65 | 1.65 | 1.65 | 1.65 | 1.65 |
| Silicone Wacker CLM 42205 | | | | | | | | | | | |
| D3710 | | | | | | | | | | | |
| Tolylene diisocyanate | | | | | | | | | | | |
| DBTDL | | | | | | | | | | | |
| Ammonium Octamolybdate | | | | | | | | | | | |
| Expandable graphite 220-80B | | 0.18 | 0.90 | 1.86 | 2.97 | 4.23 | 0.15 | 0.87 | 1.83 | 2.89 | 4.11 |
| Zinc borate | | | | | | | | | | | |
| Aluminum trihydroxide | | | | | | | | | | | |

| Resin or dispersion | Compositions Wt. (g) | | | | | | | | | |
|---|---|---|---|---|---|---|---|---|---|---|
|  | S12 | S13 | S14 | S15 | S16 | S17 | S18 | S19 | S20 | S21 |
| Silicone fluid 65000 | 14.40 | | | | | | | | | |
| D4608 | | 15.84 | | | | | 15.84 | 15.84 | 15.84 | |
| D5006 | | | 15.84 | 15.84 | 15.84 | | | | | |
| MY-0510 | 1.76 | 1.76 | 1.76 | 1.76 | 1.76 | 1.76 | 1.76 | 1.76 | | |
| Silicone Wacker CLM 42205 | | | | | | | | | 20.00 | |
| D3710 | | | | | | | | | | 22.00 |
| Tolylene diisocyanate | | | | | | | | | 1.34 | 1.34 |
| DBTDL | | | | | | | | | 0.10 | 0.12 |
| Ammonium Octamolybdate | 0.68 | 0.68 | | 0.68 | 0.68 | 0.76 | 0.72 | 0.72 | | 1.00 |
| Expandable graphite 220-80B | 1.60 | | 1.72 | 1.56 | 1.56 | 1.76 | 0.72 | 0.24 | | 2.34 |
| Zinc borate | 2.28 | 2.32 | 2.44 | | 2.24 | 2.52 | 2.4 | 2.32 | | 3.34 |
| Aluminum trihydroxide | 2.28 | 2.32 | 2.44 | 2.24 | | 2.52 | 2.4 | 2.32 | | 3.34 |

Procedure:

The ingredients of the formulations S1-S19 were added and mixed as follows:

1$^{st}$ addition: All the components but the epoxy resin MY-0510 or the D4608 or the D5006 (where applicable). Thorough mixing.

2$^{nd}$ addition: The epoxy resin MY-0510 or the D4608 or the D5006 (where applicable), was added to the previously prepared mixtures.

Subsequently, they were mixed thoroughly and then coated on aluminium strips (for flammability testing) according to the procedure described above.

The ingredients of the formulations S20-S21 were added and mixed as follows:

1$^{st}$ addition: All the components except the tolylene diisocyanate. Thorough mixing.

2$^{nd}$ addition: Tolylene diisocyanate was added to the previously prepared mixtures.

Subsequently, they were mixed thoroughly and then coated on aluminium strips (for flammability testing) according to the procedure described above.

The following Table summarizes the BSS7230 flammability test results for the reference compositions.

TABLE 7

| BSS7230 Test | Compositions | | | | | | | | | | | |
|---|---|---|---|---|---|---|---|---|---|---|---|---|
|  | S1 | S2 | S3 | S4 | S5 | S6 | S7 | S8 | S9 | S10 | S11 | S12 |
| Extinction time (sec) | 0 | 0 | 0 | 0 | 0 | 0 | 42 | 8 | 0 | 0 | 0 | 0 |
| Burn length (cm) | 6.00 | 4.00 | 3.00 | 3.00 | 3.00 | 2.00 | 20.00 | 8.00 | 4.00 | 4.00 | 1.00 | 2.00 |
| Dripping extinction time (sec) | 0 | 0 | 0 | 0 | 0 | 0 | 0 | 0 | 0 | 0 | 0 | 0 |
| Afterglow (sec) | 0 | 0 | 0 | 0 | 0 | 0 | 0 | 0 | 0 | 0 | 0 | 0 |

TABLE 7-continued

| Smoke level | 2 | 4 | 4 | 4 | 4 | 4 | 3 | 3 | 1 | 1 | 0 | 0 |

| BSS7230 Test | S13 | S14 | S15 | S16 | S17 | S18 | S19 | S20 | S21 |
|---|---|---|---|---|---|---|---|---|---|
| Extinction time (sec) | 10 | 0 | 0 | 0 | 0 | 0 | 0 | 15 | 0 |
| Burn length (cm) | 7.00 | 2.00 | 2.50 | 2.00 | 1.00 | 3.00 | 4.00 | 13.00 | 3.00 |
| Dripping extinction time (sec) | 0 | 0 | 0 | 0 | 0 | 0 | 0 | 0 | 0 |
| Afterglow (sec) | 0 | 0 | 0 | 0 | 0 | 0 | 0 | 0 | 0 |
| Smoke level | 5 | 0 | 1 | 0 | 0 | 2 | 3 | 2 | 1 |

An additive-free composition (S1) presented a very good flame proofness that was further enhanced by the introduction of expandable graphite (loads>5% w/w) and nano-clay. Compositions, S1-S11 illustrate the effect of varying amounts of expandable graphite. Flammability test data of the S1 composition compared to those of the S2-S6 compositions shows a synergy between silicon and expandable graphite.

The effect of nano-clay in a silicon-based composition is further enhanced when it is combined with other inorganic additives for loads of expandable graphite higher than 3% w/w (compositions S12 and S17). The effect of including expandable graphite in silicon-based compositions is illustrated by comparing the flammability test data of the compositions S13 and S17. The role of ammonium octamolybdate in silicon-based compositions seems to be rather positive for decreased flammability (S14 and S17) rather than acting as a smoke suppressant. Aluminium trihydroxide (S16) appears to behave like ammonium octamolybdate in silicon-based polymeric platforms.

The flammability test data of the S17-S19 compositions confirm the synergy between silicon and expandable graphite. The improvement of the fire resistance of a much softer material, a silicon-based polyurethane, is illustrated by compositions S20 and S21. Composition S17 presented the best flame retardancy performance achieved.

Examples 50-65

Preparation of Novel Flame Retardant Compositions Based on Silicon and Carbon Polymeric Blends The following formulations were prepared according to the procedure described below

TABLE 9

| Resin or dispersion | Compositions | | | | | | | | | | | | | | |
|---|---|---|---|---|---|---|---|---|---|---|---|---|---|---|---|
| | CS1 | CS2 | CS3 | CS4 | CS5 | CS6 | CS7 | CS8 | CS9 | CS10 | CS11 | CS12 | CS13 | CS14 | CS15 |
| | Weight (g) | | | | | | | | | | | | | | |
| Silicone fluid 65000 | 13.34 | 13.34 | 8.98 | 8.98 | 4.44 | 4.44 | 2.14 | 2.14 | 1.06 | 1.06 | 0.54 | 0.54 | | | |
| D3508 | | 6.12 | | 9.80 | | 13.02 | | 15.56 | | 16.50 | | 8.45 | | | |
| MY-0510 | 5.58 | | 8.92 | | 11.84 | | 14.16 | | 15.00 | | 15.38 | | | | |
| Tetraethylpentamine | 1.04 | 1.04 | 2.10 | 2.10 | 3.16 | 3.16 | 3.70 | 3.70 | 3.94 | 3.94 | 4.08 | 4.08 | | | |
| Silicone Wacker CLM 42205 | | | | | | | | | | | | | 10.00 | | |
| Voranol EP1900 | | | | | | | | | | | | | 10.00 | | |
| D3710 | | | | | | | | | | | | | | 11.00 | |
| D3711 | | | | | | | | | | | | | | 11.00 | |
| Tolylene diisocyanate | | | | | | | | | | | | | 1.26 | 1.26 | |
| DBTDL | | | | | | | | | | | | | 0.12 | 0.12 | |
| D3611 | | | | | | | | | | | | | | | 5.30 |
| D3811 | | | | | | | | | | | | | | | 3.63 |
| Poly(urethane-methacrylate) | | | | | | | | | | | | | | | 3.00 |
| Dimthelyl p-toluidine | | | | | | | | | | | | | | | 0.60 |
| Benzoyl peroxide | | | | | | | | | | | | | | | 0.33 |
| Ammonium Octamolybdate | | 0.88 | | 0.90 | | 0.88 | | 0.92 | | 0.92 | | 0.92 | | 0.92 | 0.86 |
| Expandable grpahite 220-80B | | 2.06 | | 2.08 | | 2.06 | | 2.14 | | 2.16 | | 2.16 | | 2.16 | 2.00 |
| Zinc borate | | 2.94 | | 2.98 | | 2.94 | | 3.06 | | 3.08 | | 3.08 | | 3.10 | 2.86 |
| Aluminum trihydroxide | | 2.94 | | 2.98 | | 2.94 | | 3.06 | | 3.08 | | 3.08 | | 3.10 | 2.86 |

Procedure:

The ingredients of the formulations CS1-CS13 were added and mixed as follows:

$1^{st}$ addition: All the components except the epoxy resin MY-0510 or the D3508 (where applicable). Thorough mixing.

$2^{nd}$ addition: The epoxy resin MY-0510 or the D3508 (where applicable), was added to the previously prepared mixture.

Subsequently, they were mixed thoroughly and then coated on aluminium strips (for flammability testing) according to the procedure described above.

The ingredients of the formulations CS14-C14 were added and mixed as follows:

$1^{st}$ addition: All the components except the tolylene diisocyanate and the benzoyl peroxide, respectively. Thorough mixing.

2$^{nd}$ addition: Tolylene diisocyanate and benzoyl peroxide were added to their corresponding previously prepared mixtures.

Subsequently, they were mixed thoroughly and then coated on aluminium strips (for flammability testing) according to the procedure described above.

The following Table summarizes the BSS7230 flammability test results for the reference compositions.

TABLE 10

| BSS7230 Test | Compositions | | | | | | | | | | | | | | |
|---|---|---|---|---|---|---|---|---|---|---|---|---|---|---|---|
| | CS1 | CS2 | CS3 | CS4 | CS5 | CS6 | CS7 | CS8 | CS9 | CS10 | CS11 | CS12 | CS13 | CS14 | CS15 |
| Extinction time (sec) | 0 | 0 | 0 | 0 | 19 | 0 | 22 | 3 | 24 | 3 | 27 | 3 | 4 | 0 | 0.00 |
| Burn length (cm) | 15.0 | 3.0 | 16.0 | 3.0 | >20 | 2.0 | >20 | 6.0 | >20 | 2.5 | >20 | 6.0 | 10.0 | 3.5 | 3.5 |
| Dripping extinction time (sec) | 0 | 0 | 0 | 0 | 0 | 0 | 8 | 0 | 12 | 0 | 16 | 0 | 0 | 0 | 0 |
| Afterglow (sec) | 0 | 0 | 0 | 0 | 0 | 0 | 0 | 0 | 0 | 0 | 0 | 0 | 0 | 0 | 0 |
| Smoke level | 4 | 1 | 4 | 2 | 5 | 2 | 5 | 3 | 5 | 3 | 5 | 3 | 2 | 0 | 0 |

In the case of blending carbon- and silicon-based platforms followed by subsequent crosslinking of both or at least one i.e. in the case one of the two polymers is not functional, it becomes evident that even when extremely low amounts of silicone are used (down to 3% w/w) and even without the introduction of any organic/inorganic additives (compositions CS9 and CS11) a dramatic decrease in the extinction time compared with the reference R1 composition was achieved.

Example 66

In order to assess the physical/mechanical properties of the compositions of the present application, a commercially available and non-flame retarded, two component epoxy-based adhesive the EPIBOND 1590® ((Trade Mark, Vantico Ltd.) was reformulated (Adhesive 1) according to the claimed compositions and its flame retardancy along with an array of physical/mechanical properties was recorded.

Procedure:

Preparation of Part A of the Adhesive 1

The resin part of the EPIBOND 1590® (70 g) and Cloisite 10A® (7.25 g) were mixed in a high shear mixer for 4-6 h. Subsequently, 7.00 g of Grafguard 220B, 3.00 g of ammonium octamolybdate, 10.00 g of Firebrake-ZB and 10.00 g of Apyral-22 were added to the mixture and mixing was continued in a low shear mixer for about an hour.

Preparation of Part B of the Adhesive 1

The hardener part of the EPIBOND 1590® (70 g) and 7.00 g of Grafguard 220B, 3.00 g of ammonium octamolybdate, 10.00 g of Firebrake-ZB and 10.00 g of Apyral-22 were mixed in a low shear mixer for about an hour.

The two components of the Adhesive 1 were mixed in a mixing ratio of 1.95:1 w/w (Part A: Part B). The curing process of the samples prepared was: a) 7 days @ 23° C. (Adhesive 1-23C) and 4 h @ 60° C. (Adhesive 1-60C)

The following Table depicts the physical/mechanical properties of the Adhesive 1-23C and the Adhesive 1-60C. The flame retardancy of the both samples was tested according to the flame retardancy method described in the Experimental and in a "blue" flame.

TABLE 11

| Physical/Mechanical Properties | Adhesive 1-23C | Adhesive 1-60C | EPIBOND 1590 ® |
|---|---|---|---|
| Glass transition temperature (° C.) by DSC | 58 | 72 | n.d. |
| Glass transition temperature (° C.) by TMA | 60 | 82 | n.d. |
| Glass transition temperature (° C.) by DMA* | 146 | 143 | n.d. |
| Thermal expansion coefficient (10$^{-6}$ · K$^{-1}$) below glass transition | 78 | 82 | n.d. |
| Thermal expansion coefficient (10$^{-6}$ · K$^{-1}$) above glass transition | 110 | 124 | n.d. |
| Young's storage modulus (MPa) @ 23° C. | 775 | 567 | n.d. |
| Charpy impact strength (KJ/m$^2$) | n.d. | 3 | n.d. |
| Fracture energy (J/m$^2$) | 438 | 1263 | n.d. |
| Fracture toughness (MPa · m$^{1/2}$) | 1 | 2 | n.d. |
| Compression strength (MPa) | 38 | 57 | n.d. |
| Compression modulus (MPa) | 1238 | 1440 | n.d. |
| Lap shear strength (MPa) | 14 | 18 | n.d. |
| Average peel load (N) | 24 | n.d. | n.d. |
| Extinction time (sec) | 0 | 0 | 15 |
| Dripping (sec) | 0 | 0 | 0 |
| Burn length (cm) | 2 | 2 | 18 |
| Smoke | 1 | 1 | 5 |

*The samples were tested after been remained at 23° C. for 6 months.

Example 67

In order to assess the thermal insulation potential of the compositions of the present application, the Adhesive 1-23C prepared as mentioned in Example 66, was tested according to the thermal insulation assessment method.

Example 68

The thermal insulation of a specimen of EPIBOND 1590® cured at 23° C. for 7 days was also assessed according to the thermal insulation assessment method. In its case the flame applied for only 165 sec because the specimen was completely burned out after this time.

Example 69

FIG. 1 depicts the results recorded by the thermal insulation assessment method for the Adhesive 1-23C and the EPIBOND 1590® prepared and tested in Examples 67 and 68, respectively. After 165 see the specimen of EPIBOND 1590® was completely burned out with maximum recorded temperature of approx. 565° C., exceeding by much the materials initial decomposition temperature. In contrast Adhesive 1-23C remained dimensionally intact after approx. 260 sec. Above 180-200 sec, the temperature of the Adhesive 1-23C remained almost levelled (maximum temperature recorded: 226° C.).

The invention claimed is:

1. A composition comprising (a) at least one expandable particulate material which expands on the application of heat and (b) at least one particulate intercalated nano-clay, together with at least one polymer and/or at least one curable monomer or oligomer.

2. The composition according to claim 1, which also comprises at least one other particulate material having fire retardant properties.

3. The composition according to claim 2 wherein the particulate material having fire retardant properties is a metal oxide/acid, a hydrate, a hydroxide, a carbonate, a sulphate, a silicate, a nitride, a molybdate or a stearate.

4. The composition according to claim 2 wherein the particulate material having fire retardant properties is a zinc or calcium borate, stannate or molybdate, a zinc or magnesium stearate, an ammonium molybdate, a calcium hydroxide, an aluminum trihydroxide, a silicon oxide, a silicon nitride, a boron nitride, a sodium metalsilicate pentahydrate, a potassium tetraborate tetrahydrate, a magnesium hydroxide, a magnesium silicate, a titanium oxide, a ferric oxide, a molybdenum oxide, a lead phthalate, a stannous chloride, or a complex thereof.

5. The composition according to claim 1 which comprises two or more particulate materials having fire retardant properties.

6. The composition according to claim 2 wherein the particulate material having fire retardant properties is present in an amount of from 1 to 95% w/w based on the total weight of the composition.

7. The composition according to claim 1 wherein the polymer and/or curable monomer or oligomer contains one or more epoxy, acrylic, methacrylic, amine, hydroxyl, carboxyl, anhydride, olefinic, styrene, acetoxy, methoxy, ester, cyano, amide, imide lactone or urethane groups.

8. The composition according to claim 1 wherein the intercalated nano-clay is present in an amount of from 0.1 to 95% w/w based on the total weight of the composition.

9. The composition according to claim 1 wherein the expandable particulate material is present in an amount of from 0.1 to 95% w/w based on the total weight of the composition.

10. The composition according to claim 1 which is an adhesive, sealant or coating composition.

11. A cured article which comprises a polymer matrix in association with at least one expandable particulate material which expands on the application of heat and at least one intercalated nano-clay.

12. A process for the manufacture of a cured article which comprises admixing at least one expandable particulate material which expands on the application of heat with at least one intercalated nano-clay and at least one curable monomer, oligomer and/or polymer to form a mixture and subsequently curing the mixture.

13. A method of making an adhesive bond, seal or coating comprising applying a composition according to claim 1 to a substrate and curing the composition.

14. A composition comprising (i) one or more reactive monomers, oligomers and/or polymers containing reactive species selected from the group consisting of:
   a. epoxy-functional compounds and resins in combination with amino-functional compounds, resins, oligomers, or polymers;
   b. hydroxy-functional compounds, oligomers, polymers in combination with isocyanate-functional monomers, dimers, oligomers, or polymers;
   c. methacrylic or acrylic functional monomers in combination with methacrylic or acrylic functional oligomers or polymers;
   d. amino-functional polyorganosiloxane in combination with epoxy-functional compounds, resins or oligomers;
   e. hydroxy-functional polyorganosiloxane in combination with isocyanate-functional monomers, dimers or oligomers;
   f. methacrylated or acrylated polyorganosiloxane;
   g. epoxy-functional compounds and resins and amino-functional compounds, resins, oligomers, or polymers in combination with amino-functional polyorganosiloxane and epoxy-functional compounds, resins or oligomers;
   h. hydroxy-functional compounds, oligomers, or polymers and isocyanate-functional monomers, dimers, oligomers, or polymers in combination with hydroxy-functional polyorganosiloxane and isocyanate-functional monomers, dimers or oligomers; and
   i. methacrylic or acrylic functional monomers, oligomers or polymers in combination with methacrylated or acrylated polyorganosiloxane;
(ii) expandable graphite; (iii) intercalated nano-clay; and optionally (iv) one or more flame retardant additives and smoke suppressants selected from the group consisting of zinc borate, aluminum trihydroxide, and ammonium octamolybdate.

15. The composition according to claim 14, wherein the polyorganosiloxane is polydimethylsiloxane.

16. The composition according to claim 14 wherein the clay is montmorillonite.

* * * * *